United States Patent [19]

Savatier et al.

[11] Patent Number: 5,136,371
[45] Date of Patent: Aug. 4, 1992

[54] DIGITAL IMAGE CODING USING RANDOM SCANNING

[75] Inventors: Tristan Savatier; Alain Delpuch, both of Los Angeles, Calif.

[73] Assignee: Thomson Consumer Electronics, Inc., Indianapolis, Ind.

[21] Appl. No.: 494,101

[22] Filed: Mar. 15, 1990

[51] Int. Cl.⁵ .......................... H04N 7/12; H04N 7/13
[52] U.S. Cl. .................................. 358/133; 358/136; 358/135; 358/426; 358/261.3; 364/725
[58] Field of Search ............... 358/133, 135, 136, 425, 358/426, 261.1, 261.2, 261.3, 427, 262.1, 428; 382/41, 47, 54, 56, 50

[56] References Cited

U.S. PATENT DOCUMENTS

| | | | |
|---|---|---|---|
| 4,093,962 | 6/1978 | Ishiguro et al. | 358/135 |
| 4,375,650 | 3/1983 | Tiemann | 358/133 |
| 4,633,296 | 12/1986 | Cham et al. | 358/133 |
| 4,672,441 | 6/1987 | Hoelzlwimmer et al. | 358/136 |
| 4,754,336 | 6/1988 | Nishizawa | 358/261.1 |
| 4,772,946 | 9/1988 | Hammer | 358/133 |
| 4,785,349 | 11/1988 | Keith et al. | 358/135 |
| 4,829,376 | 5/1989 | Hammer | 358/136 |
| 4,862,261 | 8/1989 | Tanaka | 358/135 |
| 4,894,713 | 1/1990 | Delogne et al. | 358/135 |

*Primary Examiner*—James J. Groody
*Assistant Examiner*—Michael H. Lee
*Attorney, Agent, or Firm*—S. J. Stevens

[57] ABSTRACT

In a video signal coder blocks of pixels are generated, scanned in a pseudo-random order and transformed blocks of coefficients which are stored in a buffer. The resulting blocks of coefficients are quantized individually by the use of a quantization level and the coefficients of each block are individually quantized by the use of a quantization matrix. The quantization level is determined by the fullness of the buffer.

5 Claims, 4 Drawing Sheets

| 16 | 11 | 10 | 16 | 24 | 40 | 51 | 61 |
| 12 | 12 | 14 | 19 | 26 | 58 | 60 | 55 |
| 14 | 13 | 16 | 24 | 40 | 57 | 69 | 56 |
| 14 | 17 | 22 | 29 | 51 | 87 | 80 | 62 |
| 18 | 22 | 37 | 56 | 68 | 109 | 103 | 77 |
| 24 | 35 | 55 | 64 | 81 | 104 | 113 | 92 |
| 49 | 64 | 78 | 87 | 103 | 121 | 120 | 101 |
| 72 | 92 | 95 | 98 | 112 | 100 | 103 | 99 |

| 1 | 3 | 4 | 10 | 11 | 21 | 22 | 36 |
|---|---|---|----|----|----|----|----|
| 2 | 5 | 9 | 12 | 20 | 23 | 35 | 37 |
| 6 | 8 | 13 | 19 | 24 | 34 | 38 | 49 |
| 7 | 14 | 18 | 25 | 33 | 39 | 48 | 50 |
| 15 | 17 | 26 | 32 | 40 | 47 | 51 | 58 |
| 16 | 27 | 31 | 41 | 46 | 52 | 57 | 59 |
| 28 | 30 | 42 | 45 | 53 | 56 | 60 | 63 |
| 29 | 43 | 44 | 54 | 55 | 61 | 62 | 64 |

DIGITAL IMAGE CODING USING RANDOM SCANNING

BACKGROUND OF THE INVENTION

The present invention relates to digital image coding of video signals.

The immense popularity of compact digital audio discs can be partially attributed to the high sound quality and freedom from deterioration of the recording due to aging or repeated playings or from environmental factors such as dust. It is possible to enjoy similar advantages from the digital encoding of video signals as well. However, real time coding and decoding of a video signal requires much more signal bandwidth than does an audio signal, currently available transmitting and recording media provides insufficient storage capacity for video signals. It is necessary, therefore, to use some form of signal compression or digital bit reduction technique in order to record digitally-encoded video. A number of such bit reduction or signal coding methods, that will enable the recording of full-motion digital images, have been proposed in recent years.

Because the available data rate in present transmission channels and storage media is limited, these known coding methods act to reduce the data rate of the video signal. For the purpose of storing digitally-encoded full motion images on optical storage media, such as CD-ROM or MOD (Magneto Optical Disc), for example, a maximum video data rate of about 1.2 M bits/second is allowed.

One example of a system for digitally coding and decoding video signals is disclosed in an article entitled "Scene Adaptive Coder", W. H. Chen, W. K. Pratt, IEEE Transactions on Communication, Vol. COM-32, No. 3, issued in March, 1984 in which scene adaptive coding/decoding of video signals is described. The described coding technique utilizes discrete cosine transform (DCT), a variable threshold for the DCT coefficients, quantization techniques, Huffman coding and a buffer in the coder. The decoder includes a buffer, Huffman decoder, threshold adding and inverse DCT.

Another such coding/decoding system is disclosed in "Comparison Between Progressive and Interlaced Scanning for a Future HDTV System with Digital Data Rate Reduction", D. Westerkamp, H. Peters, Proceedings of the 2nd International Workshop of Signal Processing for HDTV, l'Aquila, Feb. 29–Mar. 2, 1988. The described system contains a motion adaptive intrafield-/interframe coding processor, in which the digitized video data is transformed by means of DCT to obtain the quantizing coefficients.

In the previously described systems the fullness of the buffer controls the threshold and the quantizer step size for the DCT coefficients. Both systems guarantee that the buffer will have no overflow or underflow within a given frame. This causes a varying quantizer step size and a consequently varying image quality within each frame.

In U.S. Pat. No. 4,785,349, different regions of a video frame are coded in a different manner. This may also cause a varying image quality within each frame.

From the description of the previously described systems, it is known that, for a given coding scheme, the more a block of video data is quantized, the less bits are required for coding. It is also known that the quantization level may be determined by the image, or video signal, content.

Two currently known methods may be used to compute the level of quantization required to compress the data rate of a video signal within an available number of bits N. The first method computes a threshold/quantization step size so that a frame can be coded in approximately N bits. The quantizer is then applied with this uniform step size to the whole frame. The second method scans blocks of video data by rows and columns in order to compute a local threshold/quantization step size.

The first method allows a spatially uniform quantization step size to be applied to the whole image. However, computing the right level of quantization in order to code the image to as close as possible to N bits is very difficult. The second method allows the computation of a quantization step size on a block by block basis. However, this method does not provide a uniform level of quantization in the spatial domain; therefore the image quality may be different for the blocks of each frame.

SUMMARY OF THE INVENTION

In accordance with an aspect of the present invention, a method of encoding digital image sequences comprises the steps of generating blocks of pixels from a frame of digital video information. The blocks of pixels are scanned in a pseudo-random manner and transformed to obtain corresponding blocks of coefficients. The blocks of coefficients are stored in a buffer. Each block of coefficients are individually quantized by the use of a quantization level that is controlled by the fullness of the buffer.

The advantages of the present invention will become more apparent from the following detailed description when taken in conjunction with the accompanying drawing.

DETAILED DESCRIPTION

In order to obtain a video image of medium resolution, a pixel matrix of the order of 704 by 240 pixels is necessary. The video information is illustratively encoded such that the luminance component Y is encoded for each of the pixels, whereas the color components U and V are coded in the form of macro-pixels, with a macro-pixel being made up of 4 luminance pixels.

Each video frame is divided into macro-blocks of 16 by 16 luminance pixels. Each macro-block is composed of 4 blocks of 8 by 8 pixels for the luminance component Y and one block of 8 by 8 macro-pixels for each of U and V. A single non-encoded image comprising 704 by 240 pixels consists of $(704/16) \times (240/16) = 660$ macro blocks, which equals (660×6) or 3960 blocks, equivalent to (3960×64) or 253440 bytes.

A frame of this size would occupy about 250 KByte in an uncoded format, whereas the available bandwidth of 1.2 M bits/sec would only allow about (1.2 Mbit/s) / (8×30 /s)=5 KByte per frame, which corresponds to less than ½ bit per pixel. A compression rate of about 1/50 is therefore required to be achieved.

Figure 1:
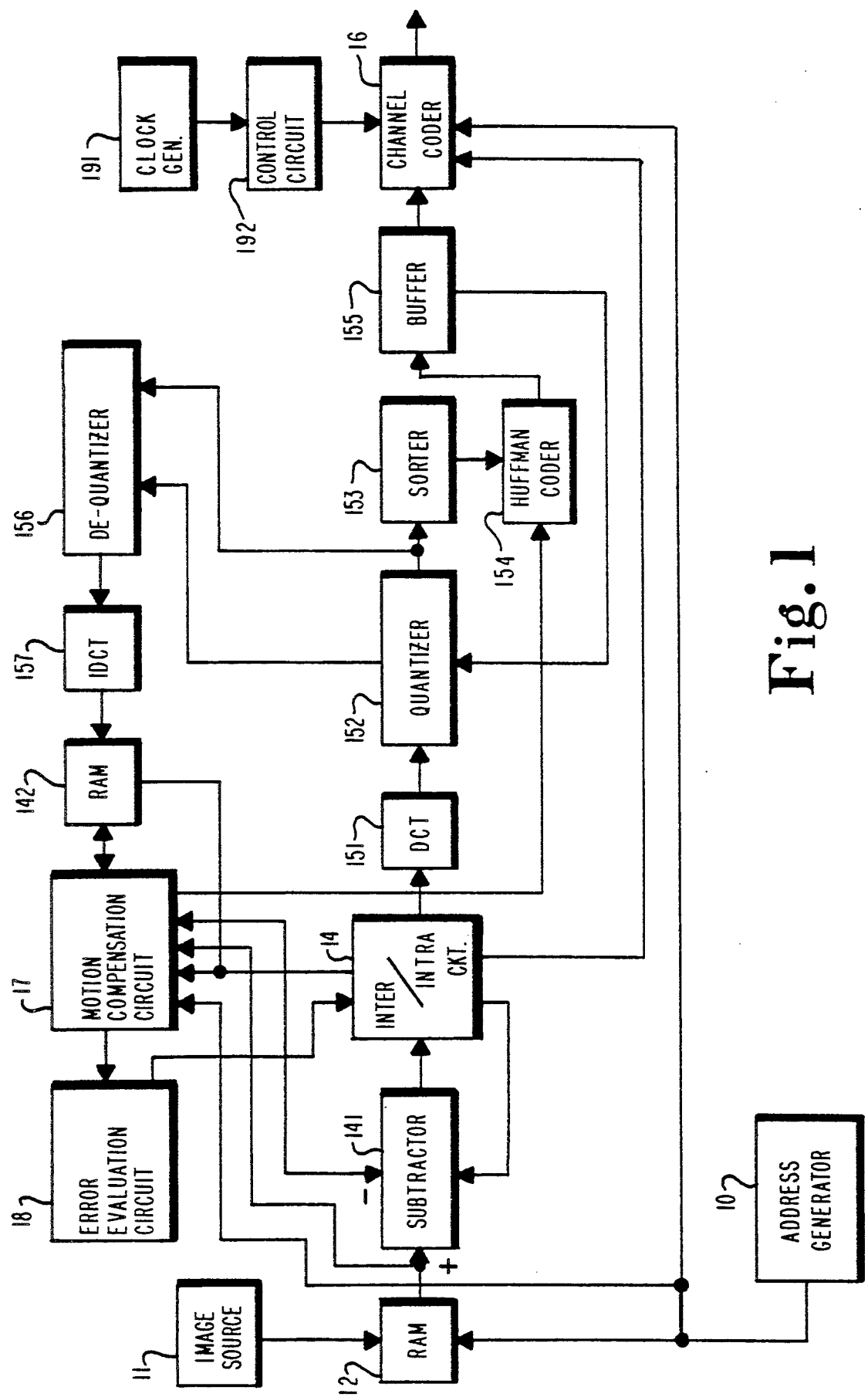
FIG. 1 is a block diagram of one embodiment of a coder constructed in accordance with an aspect of the present invention.

In FIG. 1 a digital image source 11 is connected to a random access memory (RAM) 12 which stores the video information of a frame identified as n. RAM 12 receives block addresses within a current image from a pseudo-random block address generator 10. Each block of pixels is then sent to a subtractor 141 and to a motion compensation circuit 17.

In many instances, the video information contained in the previous frame n-1 is very similar to the video information contained in the present or current frame n, only the differences between frames n-1 and n are encoded. This technique is called interframe coding (delta-coding) and results in a relatively low data rate.

However, in some cases it is necessary to encode a frame by itself, such as when there is a "cut" or scene transition int he image sequence. This technique is called intraframe coding. It is also necessary to use intraframe coding to allow non-sequential decoding when it is desirable to start decoding from various points within an image sequence stored on a CD, such as would be required for random access to video information on a disc. Intraframe coding does results in a higher data rate, however.

When there is motion in the image sequence, interframe coding may yield poor quality coded images. In those situations, the motion in the image sequence should be detected. These "motion" differences between corresponding elements in frames n-1 and n are then used to minimize the coding error of the interframe coding, thereby leading to improved image quality. The purpose of motion compensation is to build an image as close as possible to frame n by using the detected motion elements from frame n-1.

This process is performed in the motion compensation circuit 17 on a pixel block basis. A block B(n,i,j) from frame n, located at frame coordinates (i,j), for example, is evaluated by copying the block B'(n-1,i+x,j+y) located at frame coordinates (i+x,j+y) in a frame memory (RAM) 142 which contains frame n-1. A motion compensation vector V(n,x,y), representing the apparent motion of the image at frame coordinates (i,j) on the screen, is generated. When using 8 by 8 pixel blocks for motion compensation, the motion compensation vectors may have a precision of ±1 pixel and a range of · 16 pixels.

Once a good approximation of frame n has been obtained from frame n-1 by using motion compensation, the residual pixel differences remain to be encoded. An estimation of the difference between corresponding blocks of frames n-1 and n is determined and a decision is made with respect to each block as to whether motion compensated interframe coding or intraframe coding yields better image quality in connection with a given data rate. This decision is made by error evaluation circuit 18 by way of evaluation of a quadratic error function. The equation of the quadratic error is:

$$E(B,B') = \sum_{ii=0}^{7} \sum_{jj=0}^{7} (P(ii,jj) - P'(ii,jj))^2$$

where ii and jj are coordinates within the blocks B(n,i,j) and B'(n-1,i+x,j+y), respectively, of pixels P and P', respectively. E(B,B') is an estimation of the difference between block B(n,i,j) of frame n and block B'(n-1,i+x,j+y) of frame n-1. B(n,i,j) is the target block (not coded) and B'(n-1,i+x,j+y) is a block obtained from frame n-1 after interframe coding The encoding of motion compensation information is desirable only if:

$$E(B,B') > (1/2) * E(B,B_O)$$

where $B_O$ is the block B(n-1,i+x,j+y) obtained only with motion compensation (not interframe coded).

Motion compensation is calculated for 8 by 8 pixel blocks within a range of ±16 pixels, while research for the best matching block is performed in a 40 by 40 pixels area. A brute force search is performed among all the possible motion vectors (x,y) and the vector which corresponds to the minimum mean absolute error is chosen. This vector is transferred to a Huffman coder 154. Motion compensation circuit 17 may contain a memory in which this 40 by 40 pixel area is stored.

The equation of the mean absolute error Em is:

$$E(B,B') = \sum_{ii=0}^{7} \sum_{jj=0}^{7} |P(ii,jj) - P'(ii,jj)|,$$

where ii and jj are coordinates within the blocks B(n,i,j) and B'(n-1,i+x,j+y), respectively, of pixels P and P', respectively. B(n,i,j) is the target block (not coded) and B'(n-1,i+x,j+y) is the block obtained after interframe coding. The Y component pixel values are used for error evaluation.

In theory the motion compensation should be performed in the decoded frame n-1, for that is the one used at decoding time to build the next frame. Practically, however, the image source frame n-1 is used instead of the decoded frame n-1, since motion compensation vectors obtained by using source images are easier to encode efficiently, because of the lower level of noise and of the better quality of the source images compared with decoded images. Random noise tends to generate a random factor in the motion compensation vectors. A general description of motion compensation may also be found in U.S. Pat. No. 4,785,349 at columns 27-29.

The value of the quadratic error, which has been calculated in error evaluation circuit 18, is sent to inter-/intra circuit 14. In inter/intra circuit 14 the decision is made as to whether interframe or intraframe coding leads to better coded image quality. In the case of intraframe coding the block of pixels B'(n-1,i+x,j+y) from frame n-1 present at the negative input of subtractor 141 is not subtracted from the corresponding block of frame n. In interframe coding, the subtractor 141 is active and the block B'(n-1,i+x,]+y), which is stored in RAM 142, is subtracted from the corresponding block of frame n to produce motion compensation information. RAM 142 receives addresses from motion compensation circuit 17.

The resulting block of pixels or pixel differences, respectively, is transformed by a discrete cosine transform (DCT) circuit 151. Each 8 by 8 block of values representing spatial data (such as the luminance component Y) is transformed by DCT circuit 151 into an 8 by 8 block of spectral coefficients representing the frequency distribution in both horizontal and vertical directions. The range of the coefficients in the transformed block is eight times the range of the values in the source block. The top-left coefficient of the transformed block is the average value of the source block (multiplied by eight). This coefficient is called the DC value while the other coefficients are called AC values. The DC coefficient is very important so that even if a high level of quantization is performed, there should be a minimum error in the DC value. Even a small error in the DC value will produce very noticeable artifacts.

Figures 5, 6:
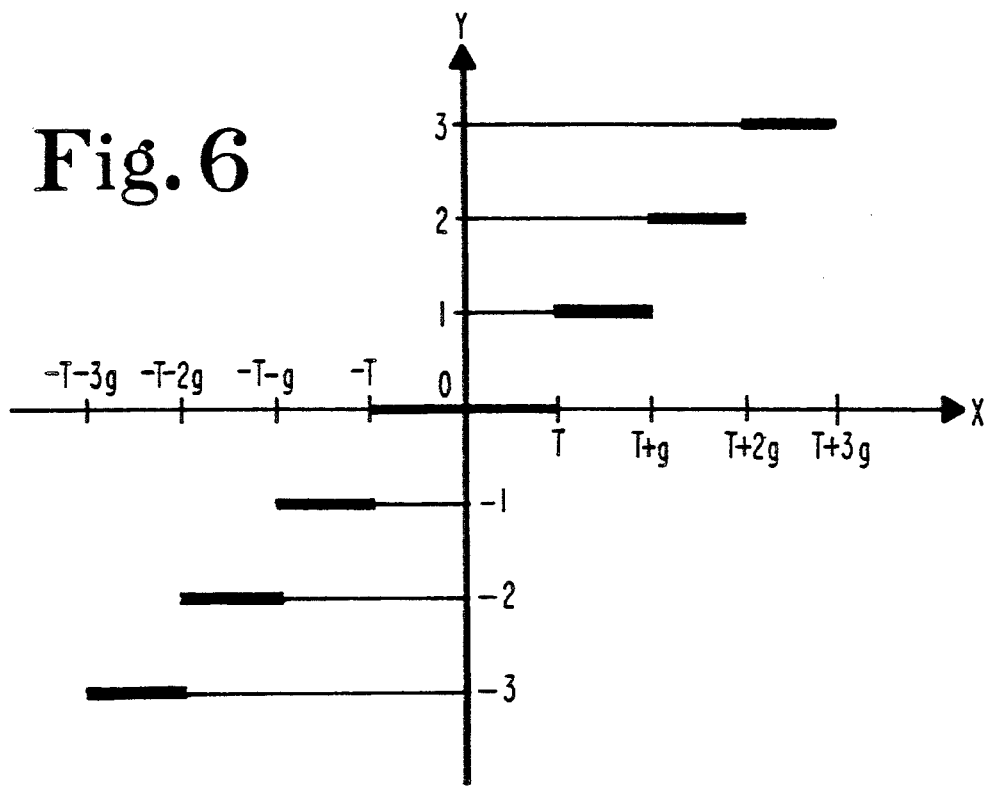
FIG. 5 illustrates a representative pixel scanning matrix.
FIG. 6 is a graph illustrating the operation of a quantizer in accordance with the present invention.

Before further encoding takes place, the block is quantized by quantizer 152 in response to an algorithm chosen to trade off perceived image quality against bit rate. The algorithm of quantizer 152 is described by the following equations:

$$y = \frac{x - T}{g} + 1 \quad \text{for } x \geq T,$$
$$y = 0 \quad \text{for } -T < x < T,$$
$$y = \frac{x + T}{g} - 1 \quad \text{for } x \leq T,$$

where x is a DCT coefficient of the transformed block, y is the quantized coefficient, T is the threshold at which the output is forced to zero and g is the quantization step size. The values of T and g are chosen according to the available transmission or storage bandwidth. The corresponding quantizer function graph is shown in FIG. 6.

Figures 3, 4:
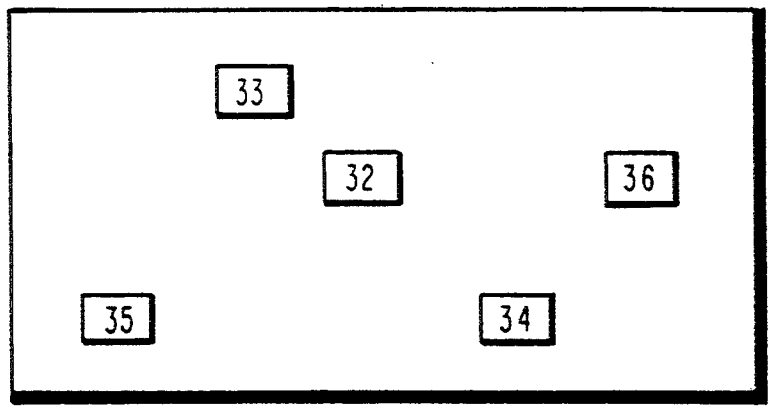
FIG. 3 is a representation of randomly scanned blocks of pixels within a video image.
FIG. 4 illustrates an example of a quantization matrix for a block of pixels.

The quantizer step size g depends on the position of the coefficient in the transformed block with high frequency coefficients being quantized less than low frequency coefficients, because lower frequency DCT coefficients are relatively less important in the perception of the subjective quality of the decoded image. The quantizer step size is obtained for each position in the block by scaling with a predefined quantization matrix Q. As an example, an illustrative quantization matrix used for Y components is shown in FIG. 4. A different quantization matrix is used for U and V components.

A minimum value should be defined for g, to guarantee that the quantized frequency coefficients are always in the range covered by the encoding code. Threshold T may be defined by T = g / 2.

In order to simulate the behavior and decoding error of the decoding circuitry, and to correct the coding calculation within the encoder illustrated in FIG. 1, a feedback loop is built consisting of a dequantizer 156 and an inverse DCT circuit 157. Dequantizer 156 performs the inverse function of quantizer 152. The decoded blocks B'(n-l,i,j) at the output of inverse DCT circuit 157 are stored in RAM 142 which is also connected to motion compensation circuit 17. By this way the feedback loop is closed.

The quantized block of data consists usually of a few important spectral components, statistically concentrated in the low horizontal and vertical frequencies, and separated by a lot of zeros. The quantized DCT coefficients in the block are unfolded thereby forming a linear list containing alternatively a run of r zeros (r may be equal to 0) and a non zero coefficient. The coefficients are then encoded with variable wordlength (runlength coding) together with the motion vectors in the Huffman coder 154.

The unfolding of each of the matrices of 64 DCT coefficients is performed by a sorter 153 accordingly to an order such as is illustratively shown in FIG. 5. The sorting starts with coefficient No. 1, which is the DC coefficient, and continues in a zig-zag diagonal manner ending with coefficient No. 64. After the last coefficient is encoded, an End-of-Block code (EOB) is generated. The zigzag order can be chosen in order to increase the probability of having a very long run of zero coefficients until the end of the block. Because the EOB code is a frequent event, it is coded with only a few bits. The optimal zigzag order depends on the quantization method and of the type of coding code used. Zigzag scanning and runlength coding are generally described in the above mentioned article "Scene Adaptive Coder" by Chen and Pratt.

The Huffman code for encoding the runs of zeros with a maximum efficiency contains 64 possible runs of r zeros (r ranging from 0 to 63). An additional code is reserved for the EOB sign. The code defined for each run of zeros is totally independent of the value that follows the run. Another Huffman code encodes the non-zero coefficients with a maximum efficiency. The range covered by this code is $[-256, -1]$ and $[+1, +256]$.

The quantized non-zero coefficients have a high probability of being $\pm 1$, particularly in the higher frequency coefficients because they are more highly quantized. Therefore a special code has been reserved to code a terminal run of $\pm 1$ values. The signs of the non-zero coefficients are always coded with one bit, as their event may be considered as random with a 50% probability. The Huffman-coded data is stored in buffer circuit 155 with a variable data rate and read out with a constant data rate. A channel coder 16 receives this data together with other signals.

In accordance with a novel aspect of the present invention, the maximum available data rate is achieved and buffer overflow and underflow is avoided by adapting the quantization step size of quantizer 152 and dequantizer 156 by means of a quantization level which is recalculated after each block has been encoded. The quantization level is calculated as a function of the amount of the already encoded data for the frame, compared with the total buffer size. In this manner, the quantization level can advantageously be recalculated by the decoder and does not need to be transmitted.

A desirable result of the present invention is the adaptation of the estimated quantization level in accordance with the actual filling rate of buffer circuit 155. The blocks 32, 33, 34, 35, 36, within the frame 31, as can be seen in FIG. 3, are scanned randomly according to the addresses generated in address generator 10. This leads to a better estimation of the appropriate overall quantization level within the present frame. The goal of avoiding buffer overflow or underflow is therefore reached with more reliability compared with techniques shown in the prior art, in which blocks of data within a frame are scanned row by row and column by column.

The novel pseudo-random block scanning order of the present invention can be changed for each frame to achieve even better results. In that case the block scanning arrangement data will be transmitted and stored.

Channel coder 16 processes the inter/intra information from inter/intra circuit 14 and the Huffman coded motion compensation information from buffer 155, along with pseudo-random address information from address generator 10 to generate the encoded video data stream Clock generator 191 supplies control circuit 192 with clock pulses. Control circuit 192 supplies the other circuits in the coder illustrated in FIG. 1 with appropriately clocked control signals. Control circuit 192 is shown illustratively coupled to channel coder 16.

Figure 2:
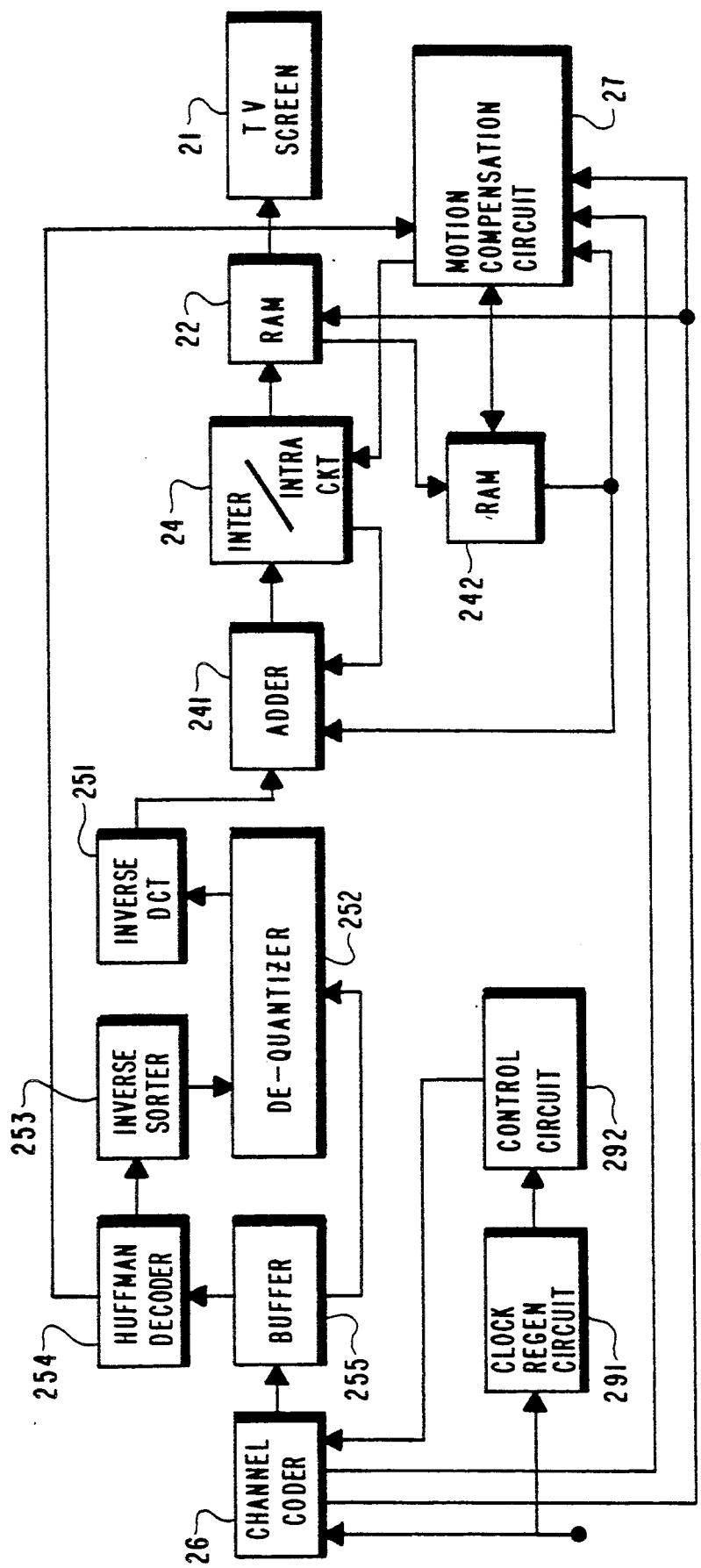
FIG. 2 is a block diagram of one embodiment of a decoder constructed in accordance with an aspect of the present invention.

In FIG. 2 a channel decoder 26 receives the storage media or transmission channel video data stream. This data stream is split into luminance and chrominance signals (Y, U and V components), motion compensation information, inter/intra decision information, audio signals, synchronizing information and, if required, pseudo-random block addresses. In addition, error correction is performed within channel decoder 26.

The luminance component of the video signal, for example, is fed with a constant data rate together with the Huffman coded motion vectors into buffer circuit 255. Information is transferred with a variable data rate from buffer 255 to a Huffman decoder 254. Huffman decoder 254 provides the corresponding decoding of the different Huffman codes previously generated by Huffman coder 154, the special code for a terminal run of ±1 values and the EOB code.

Inverse sorter 253 provides inverse scanning corresponding to the inverse of the operation of sorter 153 in a manner illustratively shown in FIG. 5. The output of inverse sorter 253 produces blocks of quantized 8 by 8 DCT coefficients. In dequantizer 252 the coefficients are expanded approximately to their value at the input of quantizer 152 shown in FIG. 1. This expansion includes an inverse scaling according to quantization matrix Q shown in FIG. 4. The quantization level used by dequantizer 252 is controlled by the fullness of the buffer and recalculated in buffer circuit 255 so that it does not need to be transmitted. An inverse DCT circuit 251 performs an inverse discrete cosine transform of the 64 coefficients of each block.

The pixel values and pixel difference values, respectively, of the decoded blocks are transferred to an adder circuit 241. In the case of intraframe coding of the present data block, the output signal from a frame memory (RAM) 242 is not added. In the case of interframe coding, the output signal B'(n-l,i-x,j+y) of RAM 242, which contains motion compensation information, is added to the pixel difference values.

An inter/intra circuit 24 receives the inter/intra information from channel decoder 26 via motion compensation circuit 27. The inter/intra circuit 24 controls the operation of adder 241. Motion compensation circuit 27 receives motion compensation vectors from Huffman decoder 254 and blocks of pixel information from frame n-1 from RAM 242.

In instances where intraframe coding has been performed, motion compensation vectors are not required and are therefore not transmitted. In instances where there is image motion from frame to frame, motion compensation circuit 27 can send motion compensation vectors received from Huffman decoder 254 as addresses to RAM 242. Motion compensation circuit 27 may illustratively contain a pixel memory.

The blocks B(n,i,j) of pixels from frame n at the output of inter/intra circuit 24 are written into a scanning frame memory (RAM) 22 with pseudo-random addresses that may be fixed, calculated or transmitted. These addresses are sent from channel decoder 26 to RAM 22 and to motion compensation circuit 27. Before being stored the decoded blocks are written into RAM 242 as frame n-1.

RAM 22 can be read out pixel by pixel and line by line. The resulting signal can be displayed, for example, on a TV screen 21.

The processing for the chrominance components U and V is performed in a similar way. The quantization matrix may vary. As previously mentioned, the motion vector calculation in motion compensation circuits 17 and 27, respectively, is carried out with the Y component only.

Clock regeneration circuit 291 supplies control circuit 292 with clock pulses. Control circuit 292 supplies all the other circuits in the decoder with appropriate control signals. Control circuit 292 is illustratively shown as being coupled to channel decoder 26.

What is claimed is:

1. A method for the encoding of a digital video signal comprising the steps of:
   generating blocks of pixels from said digital video signal;
   pseudo-random scanning said blocks of pixels;
   transforming said scanned blocks of pixels to generate corresponding blocks of coefficients;
   storing said blocks of coefficients in a buffer;
   quantizing each of said blocks of coefficients individually by the use of a quantization level and quantizing each coefficient of each of said blocks of coefficients individually by the use of a quantization matrix, said quantization level being determined by the fullness of said buffer.

2. A method for the decoding of encoded digital images comprising blocks of quantized coefficients stored in a buffer in a pseudo-random order, said method comprising the steps of:
   dequantizing each of said blocks of quantized coefficients individually by using a quantization level and dequantizing each coefficient of each of said blocks of quantized coefficients individually by the inverse use of an encoding quantization matrix to generate blocks of coefficients, said matrix being determined by the fullness of said buffer;
   inverse transforming said blocks of coefficients to generate blocks of pixels; and
   selecting said blocks of pixels in accordance with said pseudo-random order to generate a digital video signal.

3. The method defined in claim 1, further comprising the step of:
   calculating the quantization level of each of said blocks of coefficients independently in response to the fullness of said buffer.

4. The method defined in claim 1, further comprising the steps of:
   comparing said stored blocks of pixels from a frame of said digital video signal with stored blocks of pixels from a previous frame of said digital video signal to generate a pixel difference signal; and
   using said pixel difference signal to generate a motion compensation vector, said motion compensation vector being used in said quantizing of said blocks of coefficients.

5. Apparatus for encoding a digital video signal comprising a plurality of frames, comprising:
   means for generating a plurality of blocks of pixels from one of said frames of said digital video signal;
   means for scanning said blocks of pixels in a pseudo-random order;

means for transforming said blocks of pixels to generate blocks of coefficients;
means for storing said blocks of coefficients; and
means for quantizing each of said blocks of coefficients individually by the use of a quantization level and means for quantizing each coefficient of said blocks of coefficients individually by the use of a quantization matrix, said quantization level determined by the fullness of said storing means.

* * * * *